(12) United States Patent
Nesbitt et al.

(10) Patent No.: US 8,337,987 B2
(45) Date of Patent: Dec. 25, 2012

(54) EXTERIOR UV-CURED COATINGS AND COATING SYSTEMS AND METHODS OF FORMING EXTERIOR UV-CURED COATING SYSTEMS

(76) Inventors: Jeffrey E. Nesbitt, Lititz, PA (US); Robert A. Harris, Akron, OH (US)

( * ) Notice: Subject to any disclaimer, the term of this patent is extended or adjusted under 35 U.S.C. 154(b) by 260 days.

(21) Appl. No.: 12/649,036

(22) Filed: Dec. 29, 2009

(65) Prior Publication Data
US 2011/0159298 A1   Jun. 30, 2011

(51) Int. Cl.
| | |
|---|---|
| B23B 27/40 | (2006.01) |
| B05D 5/00 | (2006.01) |
| C08F 2/46 | (2006.01) |
| B32B 9/04 | (2006.01) |
| B32B 15/00 | (2006.01) |

(52) U.S. Cl. ............... 428/421; 427/508; 428/411.1; 428/423.1; 522/8; 522/71

(58) Field of Classification Search ............ None
See application file for complete search history.

(56) References Cited

U.S. PATENT DOCUMENTS

| | | | | |
|---|---|---|---|---|
| 5,859,100 | A * | 1/1999 | Wehner et al. | 524/100 |
| 6,482,890 | B2 * | 11/2002 | Kiyohara et al. | 524/806 |
| 2003/0113520 | A1 * | 6/2003 | Takahashi et al. | 428/201 |
| 2005/0129859 | A1 * | 6/2005 | Misev et al. | 427/384 |
| 2009/0188559 | A1 * | 7/2009 | Nesbitt | 136/256 |

OTHER PUBLICATIONS

Evonik Industries, ACEMATT TS100/20, product information, Feb. 2009, 2 pages.
Formosa Plastics Corporation, USA, Formolon 360, Data Sheet, Oct. 2009, 1 page.
BYK USA, NANOBYK-3600, NANOBYK-3601, NANOBYK-3602, Surface Additive Coating Nanomaterials for Rad-Cure Systems to Improve Scratch Resistance, Data Sheet, Issue Aug. 2008, 2 pages.
Ciba Specialty Chemicals, Inc. Coating Effects Segment, Ciba TINUVIN 400, Mar. 29, 2001, 3 pages.
Ciba Specialty Chemicals, Inc., Coating Effects Segment, Ciba TINUVIN 292, Jan. 20, 2005, 3 pages.
CHEMICALLAND21.com, DI-n-Butyltin Maleate, Web Page address http://chemicalland21.com/specialtychem/finechem/DI-n-BUTYLTIN%20MALEATE.htm, Search Date Feb. 22, 2009, 4 pages.
AKCROS Chemicals, Akcrostab CH-301, Web Page address http://www.akcros.com/allproducts/productsusa/akcrostabch301.aspx, Search Date Feb. 22, 2009, 1 page.
AKCROS Chemicals, Interstab BZ-5206, Web Page address http://www.akcros.com/allproducts/productsusa/interstabbz5206.aspx, Search Date Feb. 22, 2009, 1 page.
AKCROS Chemicals, Interstab ZN-18-1, Web Page address http://www.akcros.com/allproducts/productsusa/interstabzn181.aspx, Search Date Feb. 22, 2009, 1 page.
AKCROS Chemicals, Interstab CA-18-1, Web Page address http://www.akcros.com/allproducts/productsusa/interstabca181.aspx, Search Date Feb. 22, 2009, 1 page.
Dow Chemical Company, UCAR VYHH Solution Vinyl Resin, Product Information, Form No. 322-00104-0502, Web Page Address http://www.dow.com/PublishedLiterature/dh_0037/0901b80380037ee0.pdf?filepath=svr/pdfs/ noreg/322-00104.pdf&fromPage=GetDoc, 1 page.
Hallstar, Polymeric Plasticizers for Flexible PVC, Brochure, Web Page Address http://74.125.93.132/search?q=cache:8dOVypKRABsJ:www.hallstar.com/techdocs/Polymeric_PVC_Brochure.pdf+polymeric, Search Date Nov. 2, 2009, 7 pages.
Dow Chemical Company, UCAR Solution Vinyl Resins Formulation of Pigmented Coatings, DOW Answer Center. Answer ID 3974, Web Address http://dow-answer.custhelp.com/cgi-bin/dow_answer.cfg/php/enduser/std_adp.php?p_faquid=3974&p_created=1126278930&p_sid=BSxwrwOj&p_accessibility=0&p_redirect=&p_lva=&p_sp= cF9zcmNoPTEmcF9zb3J0X2J5PSZwX2dya-WRzb3J0PSZwX3Jvd19jbnQ9MSwxJnBfcHJvZHM9MCZwX2-NhdHM9MCZwX3B2PSZwX2N2PSZwX3BhZ2U9MSZwX3NI-YXJjaF90ZXh0PTM5NzQ*&p_li=&p_topview=1, 4 pages.
Dow Chemical Company, UCAR Solution Vinyl Resins Heat Stabilizers, DOW Answer Center. Answer ID 4079, Web Address http://dow-answer.custhelp.com/cgi-bin/dow_answer.cfg/php/enduser/std_adp.php?p_faqid=4079&p_created=1127765500&p_sid=BSxwrwOj&p_accessibility=0&p_redirect=&p_Iva=&p_sp=cF9zcmNoPTEmcF9zb3J0X2J5PSZwX2dyaWRzb3J0PSZwX3J-vd19jbnQ9NCw0JnBfcHJvZHM9MCZwX2NhdHM9MCZwX3B-2PSZwX2N2PSZwX3BhZ2U9MSZwX3NIYXJjaF90ZXh0PTQw-Nzk*&p_li=&p_topview=1, 1 page.
Dow Chemical Company, UCAR Solution Vinyl Resins Plasticizers, DOW Answer Center. Answer ID 4078, Web Address http://dow-answer.custhelp.com/cgi-bin/dow_answer.cfg/php/enduser/std_adp.php?p_faqid=4078&p_created=1127765282&p_sid=BSxwrwOj&p_accessibility=0&p_redirect=&p_Iva=4079&p_sp=cF9zcm NoPTEmcF9zb3J0X2J5PSZwX2dyaWRzb3JO-PSZwX3Jvd19jbnQ9MSwxJnBfcHJvZHM9MCZwX2NhdHM9-MCZwX3B 2PSZwX2N2PSZwX3BhZ2U9MSZwX3NIYXJjaF9-OZXhOPTQwNzg*&p_Ii=&p_topview=1, 2 pages.
Dow Chemical Company, UCAR Solution Vinyl Resins Solvents and Diluents, DOW Answer Center. Answer ID 3968, Web Address http://dow-answer.custhelp.com/cgi-bin/dow_answer.cfg/php/enduser/std_adp.php?p_faqid=3968&p_created=1126124147&p_sid=BSxwrw0j&p_accessibility=0&p_redirect=&p_Iva=4078&p_sp=cF9zcmNoPTEmcF9zb3J0X2J5PSZwX2dyaWRz-b3JOPSZwX3Jvd19jbnQ9MSwxJnBfcHJvZHM9MCZwX2Nhd-HM9MCZwX3B 2PSZwX2N2PSZwX3BhZ2U9MSZwX3NIY-XJjaF9OZXhOPTM5Njg*&p_li=&p_topview=1, 11 pages.
David C. Story et al, Industrial Pigments Division, Wyandotte, MI, BASF IR Heat Reflective Pigments, The Jet Line Series, 23 pages.

* cited by examiner

*Primary Examiner* — Callie Shosho
*Assistant Examiner* — Patrick English
(74) *Attorney, Agent, or Firm* — McNees Wallace & Nurick LLC

(57) ABSTRACT

A coated system having a UV-curable coating, a method of forming the coated system, and a UV-curable coating for the coated systems are disclosed. The coated system has exterior durability and includes a film, a reflective ink applied to the film, and a UV-cured coating applied to the film. The film and the reflective ink each include at least one IR reflective pigment and at least one color chelator.

8 Claims, 1 Drawing Sheet

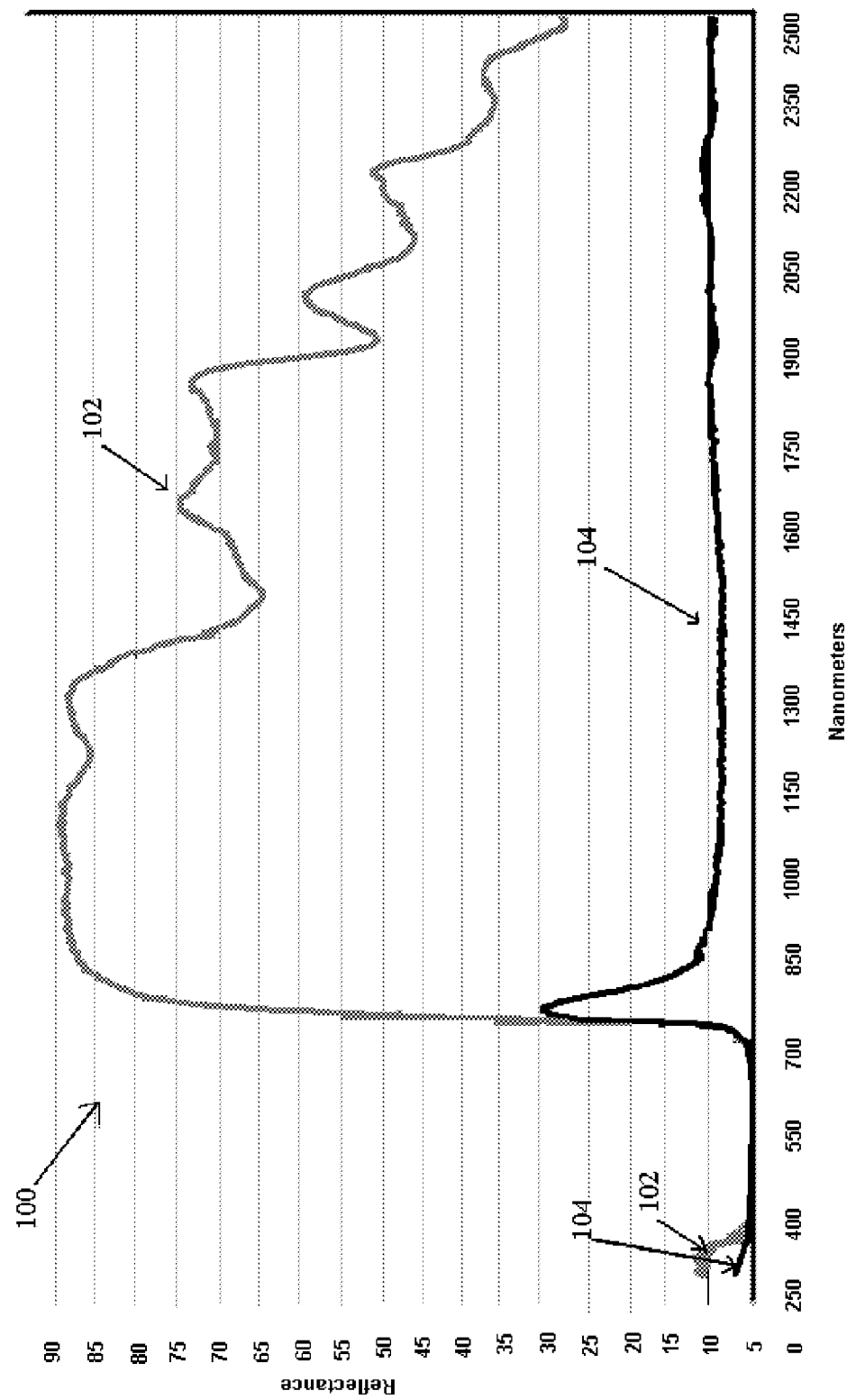

EXTERIOR UV-CURED COATINGS AND COATING SYSTEMS AND METHODS OF FORMING EXTERIOR UV-CURED COATING SYSTEMS

FIELD OF THE INVENTION

The present disclosure generally relates to exterior UV-cured coatings, coating systems, and methods of forming coating systems. More specifically, the present disclosure relates to UV-cured coatings, coating systems, and methods of forming coating systems simulated wood products.

BACKGROUND OF THE INVENTION

Many wood products are aesthetically pleasing to many consumers. Some wood products may be unavailable, expensive, or have undesirable features. Producing wood products having aesthetically pleasing qualities may, therefore, be impractical or expensive.

Wood products finished on site at a construction site may be especially expensive. Labor costs associated with wood finishing at a construction site may be high due to the inability to use manufacturing systems for finishing the materials. However, finishing materials utilized with these manufacturing systems often do not provide desirable exterior durability properties. For example, the finishing materials may yellow, may harden, may fade, and/or may permit moisture to travel through the finishing materials. Alternatively, finishing materials with desirable properties may be harmful for the environment by having a high concentration of evaporable solvents.

What is needed is a simulated wood product, a coating for the simulated wood product, and a method of forming the simulated wood product, wherein the simulated wood product may have aesthetically pleasing features, may have external durability, may be finished at a manufacturing facility, and/or may include a low solvent or solvent-free coating.

SUMMARY OF THE INVENTION

In an exemplary embodiment, a coated system having exterior durability includes a film, a reflective ink applied to the film, and a UV-cured coating applied to the film. In the embodiment, the film and the reflective ink each include at least one IR reflective pigment and at least one color chelator.

In another exemplary embodiment, a method of forming a coated system includes providing a film, applying a reflective ink to at least a portion of the film, applying a UV-curable coating to cover the reflective ink, and curing the UV-curable coating. In the embodiment, the film and the reflective ink each include at least one IR reflective pigments and at least one color chelator.

In another exemplary embodiment, a UV-curable coating having exterior durability includes a urethane acrylate blend, a light stabilizer, a UV absorber, a photoinitiator, a matting agent, and alumina particles. The exterior durability includes wear resistance, stain resistance, slip resistance, and weather resistance.

BRIEF DESCRIPTION OF THE DRAWINGS

FIG. 1 shows an exemplary wavelength versus reflectance plot of a reflective pigment according to an embodiment of the disclosure.

Wherever possible, the same reference numbers will be used throughout the drawings to represent the same parts.

DETAILED DESCRIPTION OF THE INVENTION

Provided are UV-cured coatings, coating systems, and methods of forming coating systems for printed products. Embodiments of the UV-cured coatings, the coating systems, and the methods of forming coating systems for printed products include a simulated pattern or texture such as in stone, granite, stucco, wood, or any other suitable product having aesthetically pleasing features. Embodiments may include external durability, may be finished with a low or no solvent coating in a manufacturing facility and transported to a construction site after being finished, may reduce heat buildup, may increase wear resistance, may increase stain resistance, may increase slip resistance, may increase fade resistance, and/or may increase mold and algae resistance.

Any suitable printing or coating methods, such a flexographic, gravure, ink jet, or methods using any suitable printing device can be used to create the coated system, which may simulate another product or include any suitable predetermined design. In an exemplary method of forming the coated system, a film is provided, a reflective ink is applied to at least a portion of the film, a UV-curable coating is applied to cover the reflective ink, and the UV-curable coating is cured using high energy light. The film and the reflective ink each include one or more IR reflective pigments and one or more color chelators.

In one embodiment, the film may be any suitable thermoplastic film. Examples of suitable thermoplastic films include, but are not limited to, vinyl, poly(methyl methacrylate) (PMMA), polypropylene (PP), polyethylene (PE), and polyesters such as polyethylene terephthalate (PET).

As used herein the terms "infrared" or "IR" refer to energy having a wavelength within the range of about 700 nanometers to 1 millimeter. The terms "near infrared" or "IR-A" refer to energy having a wavelength within the range of about 700 nanometers to 1400 nanometers. The term "IR-B" refers to energy having a wavelength within the range of about 1400 nanometers to 3000 nanometers. The terms "far infrared" or "IR-C" refer to energy having a wavelength within the range of about 3000 nanometers to 1 millimeter.

As used herein, the term "reflective" or "solar reflective" refers to redirecting energy away from the substrate as opposed to absorbing energy as heat, thereby contributing to the overall total solar reflectance (TSR) of the film and/or the reflective ink. For example, in embodiments where the film and/or the reflective ink include an IR reflective pigment, all IR or some IR reaching the film and/or the reflective ink may be directed in any direction away from the film by the IR reflective pigment. In some embodiments, portions or all of IR-A, IR-B, IR-C, and combinations thereof may be redirected by the film and/or the reflective ink back through the UV cured coating.

The film and the reflective ink both include IR reflective pigment(s), color chelator(s), plasticizer(s), and stabilizer(s).

The film and the reflective ink each include one or more IR reflective pigments. The one or more IR reflective pigments in the film and in the reflective ink may be the same IR reflective pigment(s) or different IR reflective pigment(s). The IR reflective pigments may reflect all or a portion of the IR may reflect or a portion of IR-A, IR-B, IR-C, and combinations thereof. In one embodiment, the film may include from about 0.5% to about 12% by weight IR reflective pigment(s). In a further embodiment, the film may include about 8% IR reflective pigment(s). In one embodiment, the reflective ink may include from about 0.5% to about 20% by weight IR reflective pigment(s). In a further embodiment, the reflective ink may include about 12% IR reflective pigment(s).

The IR reflective pigment(s) may include or be any suitable IR reflective pigment(s). In one embodiment, the IR reflective pigment(s) may include a black pigment (for example, perylene, which is a polycyclic aromatic hydrocarbon having the chemical formula $C_{20}H_{12}$). The black pigment may appear black in the visible range and have above about 90% transparency in the near infrared range. The black pigment may include a transmission profile 100 as shown in FIG. 1. As shown in FIG. 1, the black pigment may include a first transmission profile 102 when applied over a white substrate and a second transmission profile 104 when applied over a black substrate. Additionally or alternatively, IR reflective pigment(s) may include a second black pigment. The second black pigment (which may also be perylene) may have about 95% transparency in the near infrared range. Additionally or alternatively, IR reflective pigment(s) may include a brown pigment (for example, Fe—Cr, Mn—W—Ti, and/or Mn—Sb—Ti), an orange pigment (for example, Ti—Zn—Sn), a yellow pigment (for example, Cr—W—Ti), and any suitable combination. Pigment(s) may be available through BASF, Wyandotte, Mich. The pigment(s) may be dispersed in a predetermined dispersion corresponding to the pigment(s). The predetermined dispersion may permit extended weather resistance, heat stability, and/or increased tinting capability.

The film and the reflective ink each include one or more color chelators. As used herein, the term "chelator" refers to chemicals that form soluble, complex molecules with certain metal ions, inactivating the normally reactive ions so that the ions do not react with other elements or ions to produce precipitates. Generally, the chelator(s) are used to break up any conjugated polyene chains which are optically dense and impart color from yellow to red to black. In one embodiment, the film may include from about 0.5% to about 4% by weight color chelator(s). In a further embodiment, the film may include about 2% color chelator(s). In one embodiment, the reflective ink may include from about 0.5% to about 4% by weight color chelator(s). In a further embodiment, the reflective ink may include about 2% color chelator(s). The color chelator(s) in the film and in the reflective ink may be the same color chelator(s) or different color chelator(s). The color chelator(s) may include or be any suitable color chelator(s). In one embodiment, the color chelator(s) may include one or more organophosphites (for example, a liquid alkyl-aryl phosphite chelator such as di-phenyl isodecyl phosphite). Color chelator(s) may be available from Akcros Chemicals, New Brunswick, N.J.

In one embodiment, the film and the reflective ink each include one or more plasticizers. In one embodiment, the film may include from about 3% to about 20% by weight plasticizer(s). In a further embodiment, the film may include about 16% plasticizer(s). In one embodiment, the reflective ink may include from about 10% to about 20% by weight plasticizer(s). In a further embodiment, the reflective ink may include about 15% plasticizer(s). The plasticizer(s) in the film and in the reflective ink may be the same plasticizer(s) or different plasticizer(s). The plasticizer(s) may include or be any suitable plasticizer(s). For example, the plasticizer(s) may be any non-phthalate and non-migrating thermoplastic compatible polymeric plasticizer. In one embodiment, the plasticizer(s) may include a polyester adipate. The polyester adipate may have an acid number of about 1.5, a color of about 150 according to ASTM Designation D1209, a molecular weight of about 6,000 atomic mass units, a refractive index of about 1.470, a specific gravity of 1.15 at 25° C., and/or a viscosity of about 150 centipoises at 25° C. Plasticizer(s) may be available from Hallstar, Chicago, Ill. Other suitable plasticizers may be or include citrates (for example, acetyl tributyl citrate, acetyle triethyl citrate, and/or tributyl citrate), phosphates (for example, tri(2-ethylhexyl) phosphate, triphenyl phosphate, and/or tributyl phosphate), epoxies (for example, epoxidized soybean oil, 2-ethylhexyl epoxy tallate, and/or epoxidized linseed oil), polymerics (for example, adipic acid polyester, azelaic acid polyester, sebacic acid polyester, blown castor oil, blown soybean oil, blown linseed oil), dibutyl sebacate, di(2-ethylhexyl) sebacate, and/or di(2-ethylhexyl) azelate.

In one embodiment, the film and the reflective ink each include one or more stabilizers. In one embodiment, the film may include from about 1% to about 4% by weight stabilizer(s). In a further embodiment, the film may include about 2% stabilizer(s). In one embodiment, the reflective ink may include from about 2% to about 4% by weight stabilizer(s). In a further embodiment, the reflective ink may include about 2% stabilizer(s). The stabilizer(s) in the film and in the reflective ink may be the same stabilizer(s) or different stabilizer(s). For example, the stabilizer in the film may be a mixed metal stabilizer (for example, Ba—Zn, Ca—Zn, and/or Ba—Ca—Zn) and the stabilizer in the reflective ink may be a thermal stabilizer (for example, di-n-butyltin maleate having the chemical formula $C_{12}H_{20}O_4Sn$). The mixed metal stabilizer may have low volatility and be a light stabilizer. The thermal stabilizer may be resistant to degradation resulting from prolonged exposure to heat. For example, the thermal stabilizer may result in the film or the reflective ink being substantially devoid of hydrogen chloride produced through degradation of vinyl chloride. Additionally or alternatively, the thermal stabilizer may permit the film or the reflective ink to be resistant to embrittlement, loss of flexibility, and/or discoloration. In one embodiment, the thermal stabilizer may permit the film or the reflective ink to be resistant to temperatures above about 248° F. (120° C.) for more than about 5 minutes. In another embodiment, malate, a thermal stabilizer, may permit the film and/or the reflective ink to be resistance to temperatures above about 150° F. (65.5° C.).

In an exemplary embodiment, the film includes the IR reflective pigment(s), the color chelator(s), the plasticizer(s), the stabilizer(s), a resin, and one or more lubricants. The film may be between about 2 mils (51 microns) thick and about 20 mils (510 microns) thick. In one embodiment, the film is 5 mils (138 microns). The resin may include or be any suitable resin. In one embodiment, the film may include from about 60% to about 90% by weight resin. In a further embodiment, the film may include about 85% resin. In one embodiment, the resin may include or be a homopolymer having excellent electrical properties, low gel content, low contamination, excellent heat stability, and/or substantial uniformity. The resin may have a relative viscosity of 2.37 corresponding to ASTM D-1243, an inherent viscosity of 1.02 corresponding to ASTM D-1243, a K-value of 70 corresponding to Fikentscher's constant, a volatility of 31% corresponding to ASTM D-3030, a bulk density of about 31 lbs/ft$^3$ (0.49 g/cc) corresponding to ASTM D-1895, a particle size having 99.9% being above 40 mesh corresponding to ASTM D-1921, a particle size having 3% being above 200 mesh corresponding to ASTM D-1921, a contamination count of about 15 per 100 g, and/or a gel count of about 10. The resin may be available from Formosa Plastics, Delaware City, Del.

The lubricants may be any suitable lubricants permitting adhesion between the film and the reflective ink. In one embodiment, the film may include from about 0.5% to about 3% by lubricant(s). In a further embodiment, the film may include about 2% lubricant(s). Suitable commercially available lubricants include, but are not limited to, Rheolub 165 (Paraffin), Rheolub PS-1650 and RL-1800 (Calcium Stearate combination) and A-C Polyethylenes, all manufactured by Honeywell, Morristown, N.J.

In an exemplary embodiment, the reflective ink includes the IR reflective pigment(s), the color chelator(s), the plasticizer(s), the stabilizer(s), vinyl chloride-vinyl acetate copolymer (VYHH), and a solvent blend. VYHH may be any suitable vinyl chloride-vinyl acetate copolymer combination. For example, VYHH may include about 85% polyvinyl chloride-polyvinyl acetate and 15% vinyl chloride-polyvinyl acetate. VYHH is a solution resin soluble in many polar solvents, and assists in film formation with inks. In one embodiment, the reflective ink may include from about 65% to about 80% by weight VYHH. In a further embodiment, the reflective ink may include about 65% VYHH.

The solvent blend may be any suitable solvent blend. In one embodiment, the reflective ink may include from about 25% to about 60% by weight solvent blend. In a further embodiment, the reflective ink may include about 45% solvent blend. In one embodiment, the solvent blend may include or be acetone, methyl ethyl ketone, methyl propyl ketone, methyl isobutyl ketone, methyl isoamyl ketone, methyl n-amyl ketone, cyclohexanone, and/or isophorone. The solvent blend may be configured for a predetermined solvent strength, volatility, toxicity, odor, cost, flammability, and/or type of application. In one embodiment, the resin, ketone solvent, xylene, toluene, or a combination thereof is dissolved into a solution by ketones, nitroparaffins, esters, and/or chlorinated hydrocarbons.

The film may be formed by any suitable process. For example, components of the film may be dispersed and rolled to form the film. In one embodiment, the film may be a thermoplastic film capable of being manipulated by any suitable process (for example, rolling, stretching, or laminating). The manipulation may occur under high temperatures and/or after the film has cooled. In one embodiment, the film may be rolled around an 8-inch mandrel and maintain tear strength. In an exemplary embodiment, the film is the substrate. In other embodiments, the film may be laminated to other substrates. The other substrates may be any suitable material. For example, the other substrates may be other plastics, may be vinyl, may be wood, may be recycled material, or any other inexpensive material.

The reflective ink may be applied to the film in any suitable manner. For example, the film may be gravure coated. The gravure coating process may include using an engraved cylinder (for example, a copper cylinder having an etched grain pattern) to apply the reflective ink in a predetermined pattern. The engraved cylinder may include grooves and etching corresponding to the predetermined pattern for applying the reflective ink. Within the predetermined pattern, the reflective ink may be about 0.2 mils (5.1 microns) thick to about 0.4 mils (10.2 microns). In one embodiment, multiple engraved cylinders may be used. Use of multiple engraved cylinders may permit multiple colors to be applied to the film and/or may permit multiple patterns to be applied to the film. For example, a first color may be applied to the film in a predetermined pattern and then cured. Then, a second color may be applied to the film in a predetermined pattern (which may or may not be the same as the predetermined pattern of the first color) and then cured. Additionally or alternatively, use of multiple engraved cylinders may permit application of one or more portions of the predetermined pattern to one or more portions of the film. Upon the multiple engraved cylinders each applying the reflective ink, the predetermined pattern may be formed. For example, the predetermined pattern may include one or more colors including, but not limited to, cherry, oak, pine, mahogany, etc.

The predetermined pattern may be any suitable pattern. For example, the predetermined pattern may simulate a building product or may be part of a design for an artistic product. In one embodiment, the predetermined pattern simulates the features of any suitable wood product or any other suitable building product. The predetermined pattern may be solid, repeating, and/or random. In one embodiment, the predetermined pattern simulates features of a wood product. For example, the predetermined pattern may include features simulating wood grain, growth rings, knots, heartwood, and/or sapwood. Additionally or alternatively, the predetermined pattern may appear to be a rotary cut, quarter sliced, lengthwise sliced, plain sliced, half-round sliced, or rift cut veneer. The features may be formed by one or more colors provided by the one or more engraved cylinders or by any other suitable process. In one embodiment, the features of the predetermined pattern simulate a wood siding for exterior use on a building. In another embodiment, the features of the predetermined pattern simulate a wood panel (for interior or exterior use). In another embodiment, the features of the predetermined pattern simulate a plank for a wood floor (for interior or exterior use). In another embodiment, the features of the predetermined pattern simulate a plank for decking, fences, or rails. The wood simulated may be any suitable type of wood. For example, the wood pattern replicated/simulated may be any hardwood and/or any softwood. In one embodiment, a photographed, drawn, or stenciled image can be replicated by the film. For example, polka dots, logos, and/or personal images may be applied to the film. In one embodiment, an inkjet printer may be used for forming the image. Other suitable patterns may include, but are not limited to, ceramic-like patterns and stone-like patterns. The pattern may be three-dimensional and/or may include texture.

The UV-curable coating may be applied to the film and reflective ink. As used herein, the term "UV-curable coating" refers to a coating curable by ultraviolet radiation at one or more predetermined wavelengths. The UV-curable coating can be a urethane/acrylic coating having a viscosity corresponding to a preselected application process. For example, the UV-curable coating may have a relatively low viscosity corresponding to spray and/or vacuum coating application processes or a relatively high viscosity corresponding to roll coating, curtain coating process, and/or dip coating. The UV-curable coating may have a predetermined viscosity corresponding to other suitable coating application processes. Viscosity of the UV-curable coating may be adjusted by modifying the temperature of the UV-curable coating and/or by modifying the concentration of components of the formula of the UV-curable coating. For example, in a formula including urethane diacrylate oligomer, the concentration of other acrylic resins as well as monomers (such as dipropylenegylcol diacrylate and/or tripropylene glycol diacrylate) may be increased or decreased thereby increasing or decreasing the viscosity.

The viscosity and/or the preselected application process of the UV-curable coating may correspond to a predetermined application thickness. For example, the UV-curable coating may have a viscosity between about 200 and 3000 centipoises. In one embodiment, the predetermined application thickness of the UV-curable coating may be a range of thicknesses from about 0.75 mils (19 microns) to about 4.0 mils (102 microns). In a further embodiment, the thickness may be about 2.0 mils (51 microns).

The urethane acrylate blend of the UV-curable coating may be aliphatic urethane acrylate oligomer and 1,6 hexanediol diacrylate. The amount of the blend included in the UV-curable coating may be based upon a predetermined amount for providing the desired viscosity and/or for dissolving other components of the UV-curable coating. In an exemplary embodiment, the blend may form about 87% (by weight) to about 93% of the uncured UV-curable coating. In a further embodiment, the blend may form about 89% to about 91% of the uncured UV-curable coating. In a further embodiment, the blend may form about 90.1% of the uncured UV-curable coating.

The aliphatic urethane acrylate oligomer may provide adhesion, weatherability, chemical resistance, flexibility, heat resistance, and/or water resistance. An exemplary aliphatic urethane acrylate oligomer may be a clear liquid having a specific gravity of about 1.0007, a density of about 8.40 lb/gal, a refractive index of about 1.4971, a $T_g$ of about 60 degrees C., and a viscosity of about 46,500 cps., available from Sartomer Company, Inc. Additionally or alternatively, other suitable oligomers may be used.

The 1,6 hexanediol diacrylate may provide weatherability, chemical and water resistance, adhesion, hardness and abrasion resistance, heat resistance, and increased cure response. An exemplary 1,6 hexanediol diacrylate may be a clear liquid having a specific gravity of about 1.020 at 25° C., a viscosity of about 9 centipoises at 25° C., a refractive index of about 1.4560, a surface tension of about 35.7 dynes/cm, a $T_g$ of about 43° C., and a molecular weight of about 226, available from Sartomer Company, Inc. Additionally or alternatively, other suitable functional monomers configured for polymers and as crosslinking agents between molecular chains of polymers may be used.

The UV-curable coating may include alumina particles. Any suitable alumina nanoparticles may be included as the alumina particles. In an exemplary embodiment, the alumina nanoparticles may form about 1.5% to about 6% of the uncured UV-curable coating. In a further exemplary embodiment, the alumina nanoparticles may form about 2.3% of the uncured UV-curable coating. The alumina nanoparticles may provide long-term scratch, mar, and/or abrasion resistance without affecting optical clarity, gloss, color, or other physical coating properties. In one embodiment, the alumina nanoparticles may be dispersed in TPGDA at a density of about 11.33 lbs/gal at 68° F., a particle size of 40 nm, and a viscosity of about 40 mPa*s.

The UV-curable coating may include a matting agent. Any suitable matting agent may be included. In an exemplary embodiment, the matting agent may form about 3% to about 4% of the uncured UV-curable coating. In a further exemplary embodiment, the matting agent may form about 3.6% of the uncured UV-curable coating. In an exemplary embodiment, a thermal, untreated silica matting agent is included (for example, a precipitated colloidal silica). In one embodiment, the matting agent may have a particle size of about 10 micrometers (for example, as measured by laser diffraction following ISO 13320-1), may have a tamped density of about 50 g/l (for example, following ISO 787-11), may have a density of about 2.0 g cm$^3$ (for example, following IS 787-10). In one embodiment, the matting agent permits the UV-curable coating to have low gloss (for example, between about 10 and 30, which may be completely or partially formed by the UV-curable coating including a precipitated colloidal silica and/or by manipulation of UV curing. Other suitable methods of lower the gloss may additionally or alternatively be used. For example, the UV lights may be defocused, lowered intensity, angled, operated with certain gases, or combined within other wavelength lamps to achieve a desired gloss.

The light stabilizer of the UV-curable coating may be a liquid-hindered amine light stabilizer. The light stabilizer may provide protection against gloss reduction, cracking, blistering, delamination, and/or color change thereby extending the life of the coating. In an exemplary embodiment, the light stabilizer may form about 0.3% (by weight) to about 0.7% of the uncured UV-curable coating. In a further embodiment, the light stabilizer may form about 0.4% to about 0.6% of the uncured UV-curable coating. In a further embodiment, the light stabilizer may form about 0.5% of the uncured UV-curable coating. An exemplary light stabilizer may be a slightly yellow liquid, having a dynamic viscosity of 400 cps at 20° C., being more than 50% miscible with most commonly used paint solvents at 20° C., and/or having a water solubility of less than 0.01% at 20° C., as is available from Ciba-Geigy. The exemplary light stabilizer includes two active ingredients: Bis(1,2,2,6,6-pentamethyl-4-piperidyl) sebacate (having a molecular weight of about 509) and methyl 1,2,2,6,6-pentamethyl-4-piperidyl sebacate (having a molecular weight of about 370).

The UV absorber may be a liquid hydroxyphenyl-triazine UV absorber for absorbing solar radiation of one or more predetermined wavelength ranges. The UV absorber may reduce or eliminate migration based upon the hydroxy functionality and/or may have longer performance based upon high photostability. The UV absorber may retard gloss reduction, delamination, cracking and/or blistering thereby enhancing protecting effects of the UV-curable coating.

The UV absorber may convert radiation of a predetermined wavelength, here ultraviolet wavelength, into heat energy which can dissipate through the UV-curable coating without resulting in damage to the coated device. The UV absorber may permit radiation in one or more predetermined ranges to be transmitted through the UV-curable coating. In one embodiment, the UV absorber is selected to permit transmission of radiation at one or more predetermined ranges of wavelengths corresponding to ranges of wavelengths having peak response for a predetermined photoinitiator. The UV absorber may be a nonparticle $TiO_2$ (available from Kimera), a benzotriazole, and/or hydroxyphenyl-s-triazines.

In an exemplary embodiment, the UV absorber may form about 0.3% to about 0.7% (by weight) of the uncured UV-curable coating. In a further embodiment, the UV absorber may form about 0.4% to about 0.6% of the uncured UV-curable coating. In a further embodiment, the UV absorber may form about 0.5% of the uncured UV-curable coating. An exemplary UV absorber may be a liquid of about 85% of active substance in 1-methoxy-2-propanol, may be viscous and slightly yellow to yellow, may be miscible with most organic solvents, may be substantially immiscible with water, may have a density of about 1.07 g/cm$^3$, and may be available from Ciba-Geigy. The exemplary UV absorber may have a transmittance spectrum with a range of low transmittance extending from about 290 nanometers to about 350 nanometers, a range of increasing transmittance extending from about 350 nanometers to about 380 nanometers, and a range of high transmittance extending from about 380 nanometers and higher. The active substance of the exemplary embodiment may be a mixture of 2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazine having an approximated combined molecular weight of about 647.

The photoinitiator of the UV-curable coating may be a liquid mixture for photopolymerization at one or more predetermined wavelengths in a UV curing reaction. UV curing reactions can be induced by the absorption by the photoinitiator of the one or more predetermined wavelengths (generally, in the UV range) and the resulting free radical polymerization and crosslinking of resin. The photoinitiator may be any suitable compound that absorbs radiation at the one or more predetermined wavelengths thereby being raised to an excited state. From the excited state, the photoinitiator photolyzes or degrades directly or indirectly into free radicals. The free radicals may initiate the rapid polymerization of the UV-curable coating.

The photoinitiator may be any suitable material that generates free radicals upon exposure to radiation in the one or more predetermined wavelengths and includes, for example, bisaryl phosphine oxides, benzylic ketones and derivatives thereof, benzophenones and derivatives thereof, and mixtures thereof. In one embodiment, a synergist (for example, tertiary amines, acrylated tertiary amines, and/or alkoxylated acrylate monomers) may be added to the UV-curable coating to facilitate free radical generation of the photoinitiator.

The photoinitiator may be selected based upon a peak response to radiation in the UV range corresponding to the curing source. For example, to correspond with a UV light emitting strongly at one or more wavelengths within the range of about 380 nanometers to about 450 nanometers (for example, a 400 nanometer wavelength), a photoinitiator having peak response from a range of about 380 nanometers to about 450 nanometers may be selected.

The photoinitiator may permit low curing odor, improved color stability, and/or a balance between speed of cure and depth of cure. In an exemplary embodiment, the photoinitiator may form about 0.5% (by weight) to about 5.0% of the uncured UV-curable coating. In a further embodiment, the photoinitiator may form about 2.5% to about 3.5% of the uncured UV-curable coating. In a further embodiment, the photoinitiator may form about 3.0% of the uncured UV-curable coating. An exemplary photoinitiator may be a yellow viscous liquid, substantially insoluble in water, and soluble in most organic solvents, monomers, and prepolymers, and compatible with most resins, available from Lamberti. The exemplary photoinitiator may have two components: oligo[2-hydroxy-2-methyl-1-[4-(1-methylvinyl)phenyl]propanone] (at about 70%) and 2-hydroxy-2-methyl-1-phenyl propan-1-one (at about 30%). The exemplary photoinitiator may have a transmittance spectrum with a range of low transmittance extending from about 200 nanometers to about 300 nanometers, a range of increasing transmittance extending from about 300 nanometers to about 380 nanometers, and a range of high transmittance extending from about 380 nanometers and higher.

UV curing of the UV-curable coating may be performed by any suitable radiation source providing suitably intense radiation within a range of wavelengths permitting radical polymerization through excitement of the photoinitiator(s). In one embodiment, UV curing may be performed by a quartz tube with a small quantity of mercury being powered by microwave radiation, thereby vaporizing the mercury and converting the mercury into plasma to emit radiation within the range of wavelengths that excites the photoinitiator(s). Additionally or alternatively, UV curing may be performed by a quartz tube with a small quantity of mercury doped with gallium thereby permitting a deeper cure. Such "mercury lamps" or "H bulbs" and/or "gallium lamps" or "V bulbs" may include an increased range of energy between about 400 nanometers and about 450 nanometers. Other suitable UV curing systems may be used for other ranges of wavelengths or other suitable process control adjustments (for example, adjusting distance, reflector material/reflectivity, and/or focal points of the bulbs). Bulbs of various types may be used for UV curing to achieve different depth(s) of cure, to react with different photoinitiators, and/or to control energy consumption.

The UV-curable coating may be transparent to visible and near infrared light, may absorb or block UV light, may have long term durability, may retain transparency for extended periods of time (for example, beyond 20 years), may be water washable by natural precipitation or natural rain fall, may shed atmospheric pollutants and other debris easily, and/or may be resistant to color change, haze, or other changes affecting light transmission. The UV-curable coating may have Taber abrasion resistance of over 100 cycles of CS 17 wheels, may be scratch resistant, may be mar resistant, may be stain resistant, may be acid resistant, and/or may have a roughened surface.

Use of the UV-curable coating can reduce or eliminate the use of solvents, thereby reducing or eliminating the emission of volatile organic compounds (VOCs), which can harm the environment. Thus, the cost of solvents and/or solvent recovery systems may be reduced or eliminated in the coating layer. As used herein, the term "solar radiation" refers to radiation from the sun.

A UV coating process for applying and curing the UV-curable coating may be smaller in size than a solvent-based or heat-based process, may rely upon lower amounts of energy than a solvent-based or heat-based process, may cure in less than a second as opposed to the minutes or hours of a solvent-based or heat-based process, and/or may result in less waste than a solvent-based or heat-based process.

EXAMPLES

A coated film according to the present disclosure was prepared as set forth in Table 1.

TABLE 1

| Material | Approximate Weight % |
|---|---|
| Film - 5.0 mils | |
| IR reflective pigment | 5% |
| Color chelator | 2% |
| Plasticizer | 18% |
| Stabilizer | 2% |
| Resin | 69% |
| Lubricant | 2% |
| Reflective ink - 0.2 mils to 0.4 mils | |
| IR reflective pigment | 13% |
| Color chelator | 0.6% |
| Plasticizer | 6% |
| Stabilizer | 2% |
| VYHH | 30% |
| Solvent blend | 50% |
| UV-cured coating - 2 mils | |
| Urethane acrylate blend | 90.1% |
| Alumina nanoparticles | 2.3% |
| Matting agent | 3.6% |
| Light stabilizer | 0.5% |
| UV absorber | 0.5% |
| Photoinitiator | 3.0% |

The reflective ink was applied to the film by a gravure coating process having a predetermined pattern. The UV-curable coating was then applied to the film and reflective ink by a draw-down bar to mimic roll coating and cured by "V" and "H" bulbs from Fusion UV Systems.

The following properties were obtained for the coated film, disclosed in Table 1. The gauge of the coated film is about 0.005+/−5%, corresponding to ASTM D1593. The specific gravity of the coated film in Table 1 is about 1.36, corresponding to ASTM D792; however, this value varies with color. The tensile strength machine direction (MD) of the coated film in Table 1 is about 4750 psi, and the tensile strength transverse direction (TD) is about 4000 psi, corresponding to ASTM D882, Method B. The Elmendorf Tear MD of the coated film in Table 1 is about 30 gm/mil, and the TD is about 45 gm/mil, corresponding to ASTM D689. The dimensional stability MD of the coated film in Table 1 is about 0.0%, the TD is about 0.0%, corresponding to ASTM D1204 (½ hr. at 212° F.). The volatility of the coated film is about 0.3%, corresponding to ASTM D1203B. The water extraction of the coated film in Table 1 is about 1.0%, corresponding to ASTM D1004. The mineral oil extraction of the coated film in Table 1 is about 0.6% QATM 006. The flammability burn time of the coated film in Table 1 is about 10 seconds FTMS 191, corresponding to Method 5903. The char length of the coated film in Table 1 is about 4 inches. The Taber resistance exceeded 100 Cycles at about 1000 GRAMS and 1000 REVOLUTIONS using CS-17 wheels.

While the disclosure has been described with reference to a preferred embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A coated system having exterior durability, the coated system comprising:
    a film;
    a reflective ink applied to the film; and
    a UV-cured coating applied to the film; and,
    wherein the film and the reflective ink each include at least one IR reflective pigment and at least one color chelator;
    wherein the film further comprises at least one plasticizer, at least one stabilizer, resin, and at least one lubricant;
    wherein the at least one IR reflective pigment forms about 0.5% to about 12% of the film;
    wherein the at least one color chelator forms about 0.5% to about 4% of the film;
    wherein the at least one plasticizer forms about 3% to about 20% of the film;
    wherein the at least one stabilizer forms about 1% to about 4% of the film;
    wherein the resin forms about 60% to about 90% of the film; and
    wherein the at least one lubricant forms about 0.5% to about 3% of the film.

2. The system of claim 1, wherein:
    the at least one IR reflective pigment includes at least one pigment selected from the group consisting of perylene, Fe—Cr, Mn—W—Ti, Mn—Sb—Ti, Ti—Zn—Sn, Cr—W—Ti, and combinations thereof,
    the at least one color chelator includes at least one organophosphite,
    the at least one plasticizer includes a polyester adipate, and
    the at least one stabilizer includes Ba—Zn.

3. The system of claim 1, wherein the reflective ink further comprises:
    at least one plasticizer;
    at least one stabilizer;
    a vinyl chloride-vinyl acetate copolymer; and
    a solvent blend.

4. The system of claim 3, wherein:
    the at least one IR reflective pigment of the reflective ink includes at least one pigment selected from the group consisting of perylene, Fe—Cr, Mn—W—Ti, Mn—Sb—Ti, Ti—Zn—Sn, Cr—W—Ti, and combinations thereof,
    the at least one color chelator of the reflective ink includes at least one organophosphite,
    the at least one plasticizer of the reflective ink includes a polyester adipate, and
    the at least one stabilizer of the reflective ink includes di-n-butyltin maleate.

5. The system of claim 1, wherein the UV-cured coating comprises:
    a urethane acrylate blend;
    a light stabilizer;
    a UV absorber;
    a photoinitiator;
    a matting agent; and
    alumina particles.

6. The system of claim 5, wherein:
    the urethane acrylate blend comprises aliphatic urethane acrylate oligomer and 1,6 hexanediol diacrylate,
    the light stabilizer comprises Bis(1,2,2,6,6-pentamethyl-4-piperidyl)sebacate and methyl 1,2,2,6,6-pentamethyl-4-piperidyl sebacate,
    the UV absorber comprises 2-[4-[(2-Hydroxy-3-dodecyloxypropyl)oxy]-2-hydroxyphenyl]-4,6-bis(2,4-dimethylphenyl)-1,3,5-triazine and 2-[4-[(2-Hydroxy-3-tridecyloxypropyl)oxy]-2-hydroxyphenyl]-4,6-bis(2,4-dimethylphenyl)-1,3,5-triazine,
    the photoinitiator comprises oligo[2-hydroxy-2-methyl-1-[4-(1-methylvinyl)phenyl]propanone] and 2-hydroxy-2-methyl-1-phenyl propan-1-one, and
    the matting agent comprises precipitated colloidal silica; and
    the alumina particles comprise alumina nanoparticles.

7. The system of claim 5, wherein:
    the urethane acrylate blend forms about 90.1% of the coating,
    the light stabilizer forms about 0.5% of the coating,
    the UV absorber forms about 0.5% of the coating,
    the photoinitiator forms about 3% of the coating,
    the matting agent forms about 3.6% of the coating, and
    the alumina particles form about 2.3% of the coating.

8. A coated system having exterior durability, the coated system comprising:
    a film;
    a reflective ink applied to the film; and
    a UV-cured coating applied to the film; and,
    wherein the film and the reflective ink each include at least one IR reflective pigment and at least one color chelator;
    wherein the reflective ink further comprises at least one plasticizer, at least one stabilizer, a vinyl chloride-vinyl acetate copolymer, and a solvent blend;
    wherein the at least one IR reflective pigment of the reflection ink forms about 0.5% to about 20% of the reflective ink;
    wherein the at least one color chelator of the reflective ink forms about 0.5% to about 20% of the reflective ink;

wherein the at least one plasticizer forms about 10% to about 20% of the reflective ink;
wherein the at least one stabilizer forms about 2% to about 4% of the reflective ink;
wherein the vinyl chloride-vinyl acetate copolymer forms about 65% to about 80% of the reflective ink; and
wherein the solvent blend forms about 25% to about 60% of the reflective ink.

* * * * *